Nov. 27, 1923.
M. SCHLING
HAND SEED SOWER
Filed June 2, 1923
1,475,600
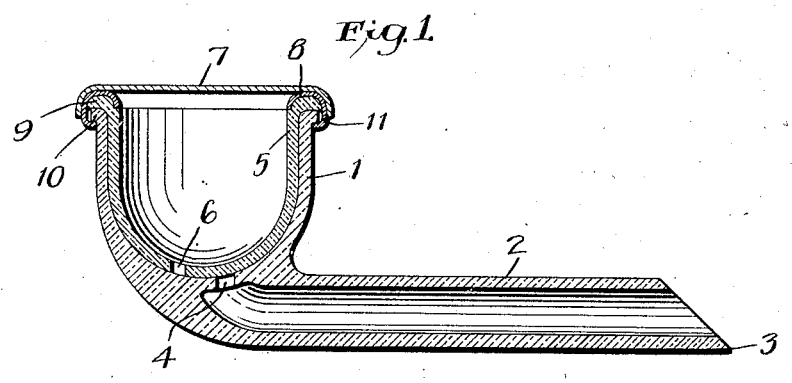
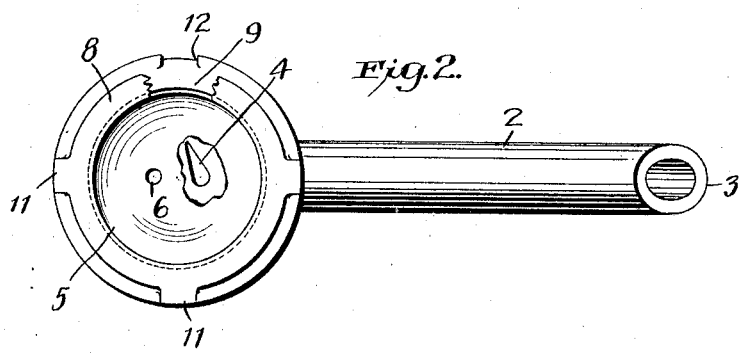
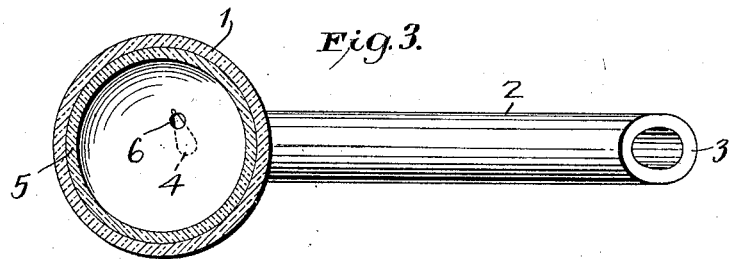
INVENTOR
Max Schling
BY
ATTORNEY Patented Nov. 27, 1923.

1,475,600

UNITED STATES PATENT OFFICE.

MAX SCHLING, OF NEW YORK, N. Y.

HAND SEED SOWER.

Application filed June 2, 1923. Serial No. 642,944.

*To all whom it may concern:*

Be it known that I, MAX SCHLING, a citizen of the United States, residing at New York city, in the county of New York and State of New York, have invented new and useful Improvements in Hand Seed Sowers, of which the following is a specification.

The invention is an improvement upon and within the hand seed-sower disclosed in my prior application Serial No. 576,430, filed July 21, 1922. These seed-sowers are especially adapted for sowing the finer flower seeds broadcast, with such certainty in spacing as to insure proper room for the development of the individual plants, prior to replanting. The sower, as disclosed in that application is an integral device, not unlike a smoker's pipe in appearance, adapted to be held in the hand, and comprising a bowl to hold the seeds and a laterally projecting hollow stem forming a sowing tube, together with means for controlling the flow of seeds from the stem to the bowl in a manner appropriate to the different sizes of seeds and the rate of delivery desired.

The present improvement is characterized by a construction including a rotatable cup fitting the fixed bowl and constituting the holder for the seeds and the means for regulating the seed-passage.

In the accompanying drawings illustrating the invention:

Fig. 1 is a vertical longitudinal section through the device, showing a cover on the bowl and cup;

Fig. 2 is a plan view with a portion of a top annulus and of the bottom of the cup, broken away, the cover being omitted; and Fig. 3 is a sectional plan view, showing the cup turned to a different position from the one seen in Figs. 1 and 2.

The device comprises the bowl proper 1 and a hollow stem 2, made preferably of one piece of transparent material. The lower part of the extremity of the stem is continued beyond the upper to form a lip 3.

In the bottom of the bowl is a seed opening 4, which opens into the rear end of the passage through the stem. This opening is disposed eccentrically with respect to the central vertical axis of the bowl, and it is elongated and tapered, being relatively broad at one end and coming to a point at the other, the longitudinal direction of the opening being tangential to a circle described about the axis of the bowl.

Within this bowl is fitted a cup 5, having an opening 6, which may be circular, in its bottom, to cooperate with the seed-opening 4 just described. The opening 6 is likewise placed eccentrically, and at the same distance from the center, so that when the cup is rotated in the bowl, as it is intended to be, the movable opening can be brought into varying degrees of register with the fixed opening. Thus, in Fig. 3 the opening 6 is shown over the small end of the opening 4, giving a very small passageway from the bowl to the stem, while if the cup is turned to carry the opening 6 toward the opposite end of the opening 4 progressively larger passageways will be obtained.

The cup can also be positioned so that the openings are entirely out of communication, in which event the passage from the bowl to the stem is cut off. The bowl, or the cup which forms a lining for the bowl, can then be used simply to hold a supply of the seeds, and for this purpose a cover 7 is shown which is adapted to be snapped or slipped over the top.

The cup is held frictionally and closely in the bowl, by an annulus 8 of springy metal, which engages the rims of the bowl and cup. As shown in Fig. 1, the two parts are preferably formed with out-turned flanges 9 and 10, and the annulus overlies the rim of the cup and is formed with lugs 11, which lie in notches 12 in the flange 9 and hook under the flange 10. In this way the cup is retained and at the same time pressed downward in close contact with the interior of the bowl, so that seeds or dirt can not get between. The resulting friction holds the cup at any position to which it may be turned.

In the use of the device, the cup is turned to secure the desired degree of passage opening from the cup and bowl to the stem, and the cup is filled with seeds. Then, by gently tapping the bowl 2 with one hand, while it is held in the other hand, a fine stream of seed will be created along the bore of the stem and caused to issue from the terminal 4 and fall precisely where and in the spacing intended upon the ground, the seed being delivered either singly or in any small quantity desired.

What is claimed as new is:

1. A pipe-like hand seed-sower of the kind described, comprising a bowl, a hollow stem projecting from the bowl forming a sowing tube, and a rotatable cup in the bowl forming a holder for the seeds and a means of regulating the passage of seeds to the stem.

2. A pipe-like hand seed-sower of the kind described, comprising a bowl having a seed opening disposed eccentrically in the bottom, a hollow stem projecting from the bowl forming a sowing tube communicating with said opening, and a rotatable cup in the bowl having an eccentric opening to cooperate with the aforesaid opening to regulate the seed passage.

3. A pipe-like hand seed-sower of the kind described, comprising a bowl, a hollow stem projecting from the bowl forming a sowing tube, a rotatable cup in the bowl forming a holder for the seeds and a means of regulating the passage of seeds to the stem, and an annulus engaging the rims of the bowl and cup to hold them in relation.

4. A pipe-like hand seed-sower of the kind described, comprising a bowl, a hollow stem projecting from the bowl forming a sowing tube, a rotatable cup in the bowl forming a holder for the seeds and a means of regulating the passage of seeds to the stem, and resilient means engaging the rims of the bowl and cup to hold the cup frictionally close to the bowl.

MAX SCHLING.